United States Patent [19]

Mizushima et al.

[11] Patent Number: 5,536,537
[45] Date of Patent: Jul. 16, 1996

[54] PROCESS OF PRODUCING SURFACE MODIFIED WEATHER STRIP FOR AUTOMOBILES

[75] Inventors: Takashi Mizushima, Aichi; Hiroyoshi Shimotsu, Tokyo, both of Japan

[73] Assignees: Toshiba Silicone Co., Ltd, Tokyo; Toyoda Gosei Co., Ltd., Aichi, both of Japan

[21] Appl. No.: 405,853

[22] Filed: Mar. 17, 1995

[30] Foreign Application Priority Data

Mar. 17, 1994 [JP] Japan .................... 6-047052

[51] Int. Cl.⁶ .................................... B05D 3/02
[52] U.S. Cl. ........................... 427/387; 427/393.5
[58] Field of Search ............. 528/38, 40; 427/387, 427/393.5

[56] References Cited

U.S. PATENT DOCUMENTS

| | | | |
|---|---|---|---|
| 3,890,271 | 6/1975 | Kokoszka | 260/46.5 R |
| 4,122,246 | 10/1978 | Sierawski | 528/15 |
| 4,228,054 | 10/1980 | Ona et al. | 260/29.2 M |
| 4,467,068 | 12/1984 | Maruyama et al. | 524/731 |
| 4,602,078 | 7/1986 | Joseph et al. | 528/34 |
| 4,760,123 | 7/1988 | Imai et al. | 528/18 |
| 5,232,611 | 8/1993 | Ohashi et al. | 252/8.6 |

FOREIGN PATENT DOCUMENTS 304958  3/1989  European Pat. Off. .

*Primary Examiner*—Shrive Beck
*Assistant Examiner*—Erma Cameron
*Attorney, Agent, or Firm*—Sughrue, Mion, Zinn, Macpeak & Seas

[57] ABSTRACT

A process of producing a surface-modified weather strip for automobiles is disclosed. The process comprises coating a silicone emulsion composition formed by mixing and dispersing the components (A) to (D) as defined hereinabove on the surface of a weather strip for automobiles, and heat curing the coating at a temperature of from 50° to 250° C. The weather strip thus produced has excellent durability, soundproof property, weather resistance, non-sticking property, antifreezing property, slipping property, abrasion resistance, etc.

23 Claims, No Drawings

5,536,537

PROCESS OF PRODUCING SURFACE MODIFIED WEATHER STRIP FOR AUTOMOBILES

FIELD OF THE INVENTION

The present invention relates to a process of producing a weather strip for automobiles having an improved soundproof property, weather resistance, non-sticking property, anti-freezing property, slipping property, and abrasion resistance by surface treating with a silicone emulsion composition not containing an organic solvent.

BACKGROUND OF THE INVENTION

Hitherto, it is known that for improving the soundproof property, weather resistance, non-sticking property, antifreezing property, slipping property, and abrasion resistance of a weather strip for automobiles, the weather strip can be subjected to a surface treatment with a silicone.

In general, it is known to use a reaction product or a mixture of epoxysilane and aminosilane (as described in JP-A52-123394, JP-A-54-43891, JP-A-54-90375, JP-A-56-78960, JP-A61-159427, and JP-A-2-233763) (the term "JP-A" as used herein means an "unexamined published Japanese patent application") and a silicone resin as a surface treating agent for a weather strip, but since these compositions are generally in the form of an organic solvent solution, when such composition are used, there is a problems of environmental pollution in addition to the problems of hygienic safety and careful handling owing to inflammability. Accordingly, the development of an emulsion type coating composition without using an organic solvent has been required.

On the other hand, silicone emulsions have hitherto been widely used as a mold release agent, a lustering agent, and a fiber treating agent, but when such silicone emulsions are used as coating compositions for weather strips, they are poor in durability and adhesion. Also, amino functional silicone emulsions which are said to have a high durability (as described in JP-A-60-127382, JP-A-62-116633, and JP-A-63-66265), a mixture of aminosiloxane and epoxysiloxane (as described in JP-B-48-17514) (the term "JP-B" as used herein means an "examined published Japanese patent application"), and a reaction product of aminosiloxane and epoxysilane (JP-B-1-22390) are proposed as a surface treating agent for weather strips but the weather strips surface treated with the above surface treating agents do not satisfy the properties such as a soundproof property, a slipping property, etc., required for the weather strips.

The reaction product or the mixture of epoxysiloxane and aminosilane dissolved in an organic solvent, which have hitherto been used, can be emulsified with a proper emulsifier. However, the weather strips coated with the emulsified product described above do not satisfy the required properties describe above.

Also, a coating composition comprising aminosiloxane and epoxysilane has compounded therewith a condensation curing reaction catalyst such as an organotin compound, an organotitanium compound, etc., and thus there are problems that the pot life of the coating liquid is short, when the respective components are compounded and the resulting mixture is stirred at a high speed to prepare the coating liquid, a gel is liable to form, and pipes are liable to be clogged with the coating liquid. Thus, an improvement has been required.

Also, a spray coating method, a dip coating method, a felt coating method, etc., are known as a method of applying a coating composition on the weather strips. However, in the dip coating method, a coating composition is liable to drip and, as the case may be, the appearance and the abrasion resistance become insufficient.

On the other hand, in the felt coating method, the problem of dripping of a coating composition does not occur but there are problems that the coating composition is cured in the felt, etc. Also, in the spray coating method, there are problems of causing clogging of a nozzle, etc.

SUMMARY OF THE INVENTION

Accordingly, an object of the present invention is to provide a process of producing a weather strip excellent in the durability, the soundproof property, the weather resistance, the non-sticking property, the antifreezing property, the slipping property, the abrasion resistance, etc., without losing the safety of the coating environment to fire and the environmental hygiene by surface treating the weather strip with a specific silicone emulsion composition.

As a result of various investigations for attaining the object described above, it has been found that the weather strip excellent in the durability, the soundproof property, the weather resistance, the non-sticking property, the antifreezing property, the slipping property, and the abrasion resistance is obtained by surface-modifying a weather strip comprising an EPDM (ethylene-propylene-diene copolymer) rubber molded product by uniformly coating the weather strip with a silicone emulsion composition obtained by mixing and dispersing an emulsion of an organopolysiloxane having an amino group with a silane having an epoxy group, an emulsion of an organopolysiloxane having a hydroxy group or a hydrolyzable group, and a dispersion comprising a polymethylsilsesquioxane and a surface active agent as a coating composition. The present invention has been completed based on this finding.

That is, according to the present invention, there is provided a process of producing a surface-modified weather strip for automobiles, which comprises coating a silicone emulsion composition obtained by mixing and dispersing the following compositions (A) to (D) on the surface of the weather strip for automobiles comprising a foam or non-foam obtained by molding an EPDM rubber, and heat curing the coating at a temperature of from 50° to 250° C.;

(A) a silicone emulsion comprising
  (a) 100 parts by weight of a primary amino group-containing diorganopolysiloxane,
  (b) from 5 to 100 parts by weight of an emulsifier, and
  (c) from 50 to 500 parts by weight of water, (B) a silicone emulsion comprising
  (d) 100 parts by weight of a dimethylpolysiloxane having a silanol group at both the terminals thereof and having a viscosity of from 10,000 to 500,000 cP.,
  (e) from 5 to 100 parts by weight of an emulsifier, and
  (f) from 50 to 1,000 parts by weight of water, in an amount such that the amount of the component (d) is from 5 to 200 parts by weight per 100 parts by weight of the component (a), (C) γ-glycidoxypropyltrimethoxysilane in an amount of from 5 to 300 parts by weight per 100 parts by weight of the component (a), and (D) a dispersion comprising
  (g) 100 parts by weight of a true spherical polymethylsilsesquioxane fine powder having an average particle size of from 1.6 to 2.6 μm, (h) from 10 to 1,000 parts by weight of a surface active agent, and (i) from 10 to 500 parts by weight of water, in an amount such that the amount of the component (g) is from 5 to 200 parts by weight per 100 parts by weight of the component (a).

DETAILED DESCRIPTION OF THE INVENTION

The present invention is described in detail below.

The EPDM (ethylene-propylene-diene copolymer) rubber which becomes a substrate of the weather strip for automobiles used in the present invention is, as is well-known, generally EPDM properly compounded with a filler such as carbon black, clay, calcium carbonate, talc, silica, calcium oxide, zinc oxide, etc.; a dispersing agent such as stearic acid, etc.; a vulcanizing agent such as sulfur, a peroxide, etc.; a vulcanization accelerator; a foaming agent; and the like. The weather strip for automobiles may be a foam or a non-foam.

The surface treating agent used in the present invention, that is, the silicone emulsion composition obtained by mixing and dispersing the following components (A) to (D), is explained in detail below.

The diorganopolysiloxane which is the component (a) of the silicone emulsion (A) of the surface treating agent used in the present invention is a diorganopolysiloxane having at least one primary amino group in one molecule and forms the silicone emulsion as the component (A) together with the emulsifier as the component (b) and water as the component (c).

The diorganopolysiloxane as the component (a) also contains a methyl group and a hydroxy group or a methoxy group in addition to the primary amino group. Examples of the primary amino group are an aminomethyl group, a β-aminoethyl group, a γ-aminopropyl group, a δ-aminobutyl group, a γ-[β-(aminoethyl)amino]propyl group, etc.

In the present invention, by using the polysiloxane having a primary amino group, the emulsion composition of the present invention can have good curability without being compounded with an organotin compound or an organotitanium compound which is generally known as a catalyst for a condensation curing reaction.

The diorganopolysiloxane as the component (a) in the present invention can be easily synthesized in one stage by carrying out the polymerization reaction of a cyclic polysiloxane monomer such as octamethylcyclotetrasiloxane in the presence of an emulsifier, water, and an amino functional silane using an acid catalyst or a base catalyst. Also, the diorganopolysiloxane is obtained by polymerizing the cyclic polysiloxane monomer in the presence of water and a polymerization catalyst and then further carrying out the polymerization reaction with the addition of an amino functional silane. Furthermore, the diorganopolysiloxane is also obtained by equilibrating a polysiloxane oil and an amino functional silane in the presence of a catalyst.

The emulsifier as the component (b) used in the present invention functions to form a stable and homogeneous silicone emulsion by emulsifying the diorganopolysiloxane as the component (a).

Examples of such an emulsifier are the following nonionic surface active agents, anionic surface active agents, and cationic surface active agents, but the use of the nonionic surface active agent or the cationic surface active agent is preferred, and the use of the nonionic active agent is more preferred.

Examples of the nonionic surface active agent are polyoxyalkylene alkyl ether, polyoxyalkylene alkyl phenol, polyoxyalkylene alkyl ester, polyoxyalkylene sorbitan ester, polyethylene glycol, polypropylene glycol, and the ethylene oxide adduct of diethylene glycol trimethyl nonanol.

Examples of the anionic surface active agent are alkylbenzenesulfonic acids such as hexylbenzenesulfonic acid, dodecylbenzenesulfonic acid, cetylbenzenesulfonic acid, myristylbenzenesulfonic acid, etc., $CH_3(CH_2)_6CH_2O(C_2H_4O)_2SO_3H$, $CH_3(CH_2)_8CH_2O(C_2H_4O)_8SO_3H$, $CH_3(CH_2)_{19}CH_2O(C_2H_4O)_2SO_3H$, $CH_3(CH_2)_8CH_2C_6H_4O(C_2H_4O)_2SO_3H$, a sulfate of a polyoxyethylene monoalkyl ether, and an alkylnaphthylsulfonic acid.

Examples of the cationic surface active agent are quaternary ammonium hydroxides such as octyltrimethylammonium hydroxide, dodecyltrimethylammonium hydroxide, hexadecyltrimethylammonium hydroxide, octyltrimethylbenzylammonium hydroxide, decylmethylbenzylammonium hydroxide, dioctadecyldimethylbenzylammonium hydroxide, beef tallow trimethyl-ammonium hydroxide, coconut oil trimethylammonium hydroxide, etc., and the salts thereof.

The emulsifier (b) is used in an amount of from 5 to 100 parts by weight, and preferably from 10 to 50 parts by weight, per 100 parts by weight of the diorganopolysiloxane as the component (a), thereby obtaining a good emulsified state.

Water as the component (c) used in the present invention becomes a dispersion medium in the case of emulsifying the diorganopolysiloxane as the component (a) with the emulsifier as the component (b), and there is no restriction on water used.

The amount of water added as the component (c) is from 50 to 500 parts by weight, and preferably from 100 to 300 parts by weight, per 100 parts by weight of the diorganopolysiloxane as the component (a), thereby obtaining a good emulsified state.

Also, in the case of synthesizing the component (a), when the component (a) is obtained as an emulsion as in the case of employing an emulsion polymerization, siloxane may not be separated from the emulsion, and the emulsion further added with, if necessary, the emulsifier and water may be used as the component (A). In particular, the emulsion obtained by an emulsion polymerization using a cyclic siloxane monomer is preferably used in the present invention since the particle sizes of the emulsion particles are small, the stability of the emulsion is good, and the composition obtained by using the emulsion shows good properties. The emulsification can be carried out using an emulsifying apparatus such as a colloid mill, a homomixer, a homogenizer, Combimix, a sand grinder, etc.

The dimethylpolysiloxane which is the component (d) of the component (B) used in the present invention is a dimethylpolysiloxane which does not have an amino group and an epoxy group and has a silanol group at both the terminals thereof, and is to form the silicone emulsion as the component (B) together with the emulsifier as the component (e) and water as the component (f).

It is desirable that the dimethylpolysiloxane as the component (d) has a viscosity of from 10,000 to 500,000 cP, and preferably from 50,000 to 200,000 cP. If the viscosity thereof is less than 10,000 cP, the reactivity is poor and a stickiness remains on the coated surface after the treatment, and if the viscosity is higher than 500,000 cP, the emulsification becomes difficult.

Examples of the emulsifier as the component (e) used in the present invention are those illustrated as the component (b) described above, and of those emulsifiers described above, the nonionic surface active agents and the cationic surface active agents are preferred.

The emulsifier (e) is used in an amount of from 5 to 100 parts by weight, and preferably from 10 to 50 parts by weight, per 100 parts by weight of the dimethylpolysiloxane as the component (d) as the same as in component (b).

Also, water as the component (f) used in the present invention is used in an amount of from 50 to 1,000 parts by weight, and preferably from 100 to 300 parts by weight, per 100 parts by weight of the dimethylpolysiloxane as the component (d) as in the case of water as the component (c) described above.

The amount of the component (B) added is such that the amount of compound (d), the dimethylpolysiloxane, is from 5 to 200 parts by weight, and preferably from 20 to 100 parts by weight, per 100 parts by weight of the organopolysiloxane as the component (a) of the component (A). This is because the amount of the component (B) added is preferably at least 5 parts by weight in order to obtain the good slipping property and the good abrasion resistance and also is preferably not more than 200 parts by weight in order not to decrease the adhesion to the substrate.

The silicone emulsion as the component (B) in the present invention can be obtained in the same manner as in the component (A) described above, and the silicone emulsion obtained by an emulsion polymerization is also preferably used.

The γ-glycidoxypropyltrimethoxysilane as the component (C) in the present invention is used in an amount of from 5 to 300 parts by weight, and preferably from 10 to 200 parts by weight, per 100 parts of the diorganopolysiloxane as the component (a) in the component (A) described above. If the amount of the component (C) is less than 5 parts by weight, the good adhesion is not obtained, while if the amount thereof is over 300 parts by weight, the coated layer obtained is hard and brittle, whereby the durability becomes insufficient.

The component (C) may be compounded with the silicone emulsion as the component (A) as it is but may be compounded therewith after mixing with a proper emulsifier for improving the dispersibility in the emulsion and the stability in the emulsion. Examples of the emulsifier used in this case are the same emulsifiers as in the component (b). Alternatively, before compounding the component (C) with the component (A) and the component (B), the compound (C) is preferably compounded with the dispersion as the component (D), and in particular, it is preferred that in the case of preparing the component (D) by dispersing the powder as the component (g) and the surface active agent in water, the component (C) is dispersed together with the above components.

The component (g) of the component (D) is a true spherical polymethylsilsesquioxane fine powder having an average particle size of from 1.6 to 2.6 μm and is to impart the slipping property and the delustering property to the weather strip of the present invention.

The form and the particle size of the component (g) are determined from the slipping property and the appearance, required for the weather strip. In particular, the average particle size is preferably from 1.8 to 2.2 μm, and also the component (g) having a particle size distribution in the range of ±30% of the average particle size is preferred.

The surface active agent as the component (h) of the component (D) is for improving the dispersibility of the polymethylsilsesquioxane fine powder as the component (g) into the emulsion and the stability thereof in the emulsion, and is to form the dispersion together with water as the component (i).

Examples of the surface active agent as the component (h) are the same materials as in the emulsifier as the component (b) described above. Of these compounds, the nonionic surface active agents are preferred.

The proportions of the surface active agent as the component (h) and the true spherical polymethylsilsesquioxane as the component (g) in the dispersion (D) are such that the amount of the surface active agent as the component (h) is from 10 to 1,000 parts by weight, and preferably from 50 to 200 parts by weight, per 100 parts by weight of the component (g).

Water as the component (i) of the component (D) is used in an amount of from 10 to 500 parts by weight, and preferably from 50 to 200 parts by weight, per 100 parts by weight of the component (h) for the stability of the component (D) and the easiness of compounding the components for the component (D).

The component (D) described above is used in such a manner that the amount of the emulsion of the polymethylsilsesquioxane fine powder as the component (g) in the component (D) is from 5 to 200 parts by weight, and preferably from 10 to 100 parts by weight, per 100 parts by weight of the diorganopolysiloxane as the component (a) in the component (A). This is because the amount of at least 5 parts by weight is preferred to obtain the slipping property and the delustering property and if the amount thereof is over 200 parts by weight, the coated layer is hard and brittle, whereby the durability becomes insufficient.

Since the silicone emulsion composition of the present invention shows a good curability by the catalytic action of the component (a) in the case of using the EPDM rubber as the object, the use of an organotin compound or an organotitanium compound which is generally known as a catalyst for the condensation curing reaction of silicone is unnecessary. It is one of the features of the silicone emulsion composition of the present invention that such other condensation curing reaction catalysts than the component (a) are not compounded and by employing such a composition, the pot life of the coating composition obtained from the silicone emulsion composition of the present invention is improved, also when the components are mixed and stirred at a high speed in the case of preparing the coating composition, any gels do not form, and further, when the coating composition is coated by a felt coating method, good coating becomes possible without forming microgels.

In the case of preparing the silicone emulsion composition of the present invention, it is preferred to prepare the silicone emulsion composition of the present invention by first mixing the polymethylsilsesquioxane fine powder as the component (g) with water as the component (i) and the surface active agent as the component (h) followed by dispersing well to prepare the dispersion as the component (D), adding thereto the silane as the component (C) followed by mixing and dispersing, and adding the component (A) and the component (B) to the mixture obtained followed by mixing with stirring. If the component (g) is mixed with the component (A) or the component (B) without forming the dispersion of the component (g), the component (g) cannot be dispersed well. Also, the silane as the component (C) cannot be dispersed well in the component (A) or the component (B) if the component (C) is not mixed and dispersed in the dispersion. Also, in the case of preparing the dispersion as the component (D), the silane as the component (C) may be mixed and dispersed in the mixture of water and the surface active agent together with the component (g) and this procedure is preferred since the silane as the component (C) can be dispersed well.

The silicone emulsion composition of the present invention may be diluted with water in the case of using for the treatment of a substrate for facilitating the coating step. In general, it is preferred to dilute the silicone emulsion composition such that the content of the silicone components becomes from 5 to 60 parts by weight, and preferably from 10 to 50 parts by weight.

In the present invention, by coating the weather strip for automobiles with the silicone emulsion composition obtained as described above and heat-curing the coating at a temperature of from 50 to 250° C., the surface modified weather strip for automobiles can be produced.

It is preferred as the coating method to coat the silicone emulsion composition using a spray coating apparatus or a methanol pump and coat the composition using a coating apparatus for leveling. Practically, there is a method of directly coating the coating composition on the EPDM substrate using a spray coating apparatus or a method of dropping the coating composition onto the EPDM substrate using a dropping apparatus which uses a methanol pump and then levelling coating the dropped composition with a felt, a brush, etc. In this case, it is preferred to coat the silicone emulsion composition of the present invention in a coverage of from 5 to 25 cc/m$^2$, and preferably from 5 to 10 cc/m$^2$.

Further, the curing method is that coated layer is heat-cured at a temperature of from 50° to 250° C., and preferably from 100° to 200° C. for from 1 to 10 minutes, and preferably from 2 to 5 minutes using a hot blast drying furnace, etc.

Since in the process of producing the surface modified weather strip for automobiles of the present invention, the silicone emulsion composition not containing an organic solvent is coated, the process is an excellent production process from the standpoints of the safety and the environmental hygiene, and also, since in the process of the present invention, the addition of the catalyst which is necessary for conventional coating compositions is not necessary, the stability of the coating liquid is excellent, whereby coating can be carried out over a long period of time, good coating can be carried out, and a coated layer having the good appearance and properties can be obtained.

The weather strip for automobiles obtained by the process of the present invention has the excellent adhesion to the substrate and durability as compared with the weather strips coated with conventional silicone emulsions and also has the abrasion resistance, the weather resistance, the water resistance, the non-sticking property, the soundproof property, the antifreezing property and the slipping property comparable to or better than those coated with the conventional coating compositions using an organic solvent.

The present invention will be described in more detail by reference to the following examples and comparative examples, but it should be understood that the invention is not construed as being limited thereto. Unless otherwise indicated, all percents, parts, ratios and the like are by weight. Further, the viscosity is the value measured at 25° C.

SYNTHESIS EXAMPLE 1

In a reaction vessel were placed 600 parts of water, 50 parts of octadecyldimethylammonium chloride, and 4 parts of potassium hydroxide followed by sufficiently mixing and further after adding thereto 400 parts of octamethylcyclotetrasiloxane, the resulting mixture was mixed. The mixture was emulsified by passing the same through a colloid mill having a mil interval of 10 mils and then polymerized by heating the emulsion at 90° C. for 4 hours. A solution of 4 parts of octadecyldimethylammonium chloride dissolved in 30 parts of γ-[N-(β-aminoethyl)amino]propyl trimethoxysilane was added to the polymerized mixture followed by mixing, and the polymerization reaction was continued at 50° C. for 2 hours. The catalyst was neutralized by the addition of acetic acid to obtain a silicone emulsion A-1 as the component (A). The content of the silicone components in the emulsion obtained was about 40%.

SYNTHESIS EXAMPLE 2

In a reaction vessel were placed 800 parts of water, 70 parts of dihexadecyldimethylammonium chloride, and 500 parts of octamethylcyclotetrasiloxane followed by sufficiently mixing, and 3 parts of potassium hydroxide was then added to the mixture followed by mixing. The mixture was emulsified in the same manner as in Synthesis Example 1 and the polymerization was carried out by heating at 95° C. for 4 hours. A solution of 7 parts of dihexadecyldimethylammonium chloride dissolved in 30 parts of γ-[N-(β-aminoethyl)amino]propyl trimethoxysilane and γ-[N-(β-aminoethyl)amino]propylmethyl dimethoxysilane was added to the polymerized mixture followed by mixing and the polymerization reaction was continued at 50° C. for 2 hours. The catalyst was neutralized by the addition of acetic acid to obtain a silicone emulsion A-2 as the component (A). The content of the silicone components in the emulsion obtained was about 40%.

SYNTHESIS EXAMPLE 3

In a reaction vessel were placed 600 parts of water, 50 parts of octadecyldimethylammonium chloride, and 4 parts of potassium hydroxide followed by sufficiently mixing, and 400 parts of octamethylcyclotetrasiloxane and 30 parts of γ-[N-(β-aminoethyl)amino]propyl methyldimethoxysilane were then added thereto followed by mixing. The mixture was emulsified in the same manner as in Synthesis Example 1 and the polymerization was carried out by heating at 90° C. for 4 hours. The catalyst was neutralized by the addition of acetic acid to obtain a silicone emulsion A-3 as the component (A). The content of the silicone components in the emulsion obtained was about 40%.

SYNTHESIS EXAMPLE 4

In a reaction vessel were placed 500 parts of water and 50 parts of dodecylbenzenesulfonic acid followed by sufficiently mixing, and 500 parts of octamethylcyclotetrasiloxane was added thereto followed by mixing. The mixture was emulsified in the same manner as in Synthesis Example 1 and the polymerization was carried out by heating at 95° C. for 4 hours. The catalyst was neutralized by the addition of triethanolamine to obtain a silicone emulsion B-1 as the component (B). The content of the silicone components in the emulsion obtained was about 30% and the viscosity of the silicone was 52,000 cP.

SYNTHESIS EXAMPLE 5

A mixture of 100 parts of polydimethylsiloxane having a viscosity of 200,000 cP, both the terminals of which were blocked with a dimethylhydroxysilyl group, 30 parts of polyoxyethylene(9) nonylphenyl ether, and 120 parts of water was emulsified in the same manner as in Synthesis Example 1 to obtain a silicone emulsion B-2 as the component (B). The content of the silicone components in the emulsion obtained was 40%.

SYNTHESIS EXAMPLE 6

A mixture of 100 parts of polydimethylsiloxane having a viscosity of 600,000 cP, both the terminals of which were blocked with a dimethylhydroxysilyl group, 30 parts of polyoxyethylene(9) nonylphenyl ether, and 120 parts of water was emulsified in the same manner as in Synthesis Example 1 to obtain a comparative silicone emulsion B'-1. The content of the silicone components in the emulsion obtained was 40%.

SYNTHESIS EXAMPLE 7

By mixing and stirring 15 parts of a true spherical polymethylsilsesquioxane fine powder having an average particle size of 2 μm, 15 parts of polyoxyethylene(15) phenyl ether, and 200 parts of water, a dispersion D-1 as the component (D) was obtained.

SYNTHESIS EXAMPLE 8

By mixing and stirring 15 parts of a true spherical polymethylsilsesquioxane fine powder having an average particle size of 2 μm, 15 parts of polyoxyethylene(9) nonylphenyl ether, and 200 parts of water, a dispersion D-2 as the component (D) was obtained.

Measurement Methods

In the present invention, the coating property, the appearance, the adhesion, the friction coefficient, the abrasion resistance, the antifreezing property, the water resistance, and the pot life were measured as follows.

Coating Property:

The state of the coated layer was evaluated as follows.
1: Uniform coated layer having no unevenness.
2: Wholly coated although unevenness was observed a little.
3: Beading and unevenness were observed.

Appearance:

The luster of the coated sample was compared with that of the sample before coating and the luster was evaluated as follows.
1: The coated layer showed a good delustered state without having luster.
2: The coated layer had a luster a little but showed a delustered state better than before coating.
3: The coated layer had a luster and delustering was insufficient.

Adhesion:

The coated sample was strongly rubbed by a finger and the adhesion was evaluated as follows from the surface state.
1: The coated layer showed an excellent adhesion without causing falling of the layer.
2: The coated layer showed slight falling or formed blur.
3: The coated layer showed falling of the layer.

Pot Life:

After preparing each coating liquid, the increase of the viscosity and the formation of gels with the passage of time were observed and evaluated as follows.
1: A remarkable increase of the viscosity and the formation of gels were not observed after one day.
2: A remarkable increase of the viscosity and the formation of gels were observed after one day.
3: Gels formed at the preparation of the coating liquid.

Friction Coefficient (Slipping Property):

From the coated sample, two samples each of 50 mm in length and 5 mm in width were cut, the two samples were adhered onto an iron plate in parallel, the iron plate was placed on the glass plate, with the samples downward, the iron plate was pulled on the surface of a glass plate in the horizontal direction while applying a load of 1 kg, the friction resistance (friction coefficient) to the glass surface was measured, and the friction coefficient was evaluated as follows.
1: The coefficient of less than 1.0 (the resistance was less and a good slipping property was shown).
2: The coefficient of 1.0 to 1.5 (slightly showed the resistance a little but the slipping property was better than that before coating).
3: The coefficient of at least 1.5 (the resistance was large and the slipping property was insufficient).

Abrasion Resistance:

The coated sample was compressed 2 mm by a coated plate, a slight vibration was added, and surface state of the sample was observed and the abrasion resistance was evaluated as follows.
1: The slight vibration of 300,000 times was added, but the surface state was good.
2: The coated layer was abraded by the slight vibration of 200,000 to 300,000 and the rubber substrate was exposed.
3: The coated layer was abraded by the slight vibration of less than 200,000 and the rubber substrate was exposed.

Antifreezing property:

Water was dropped on the surface of the coated sample, and was compressed with a metal plate. After allowing the assembly to stand in an atmosphere at −10° C. for 1 hour, the metal plate was vertically pulled upward. The freezing force at that time was measured and evaluated as follows.
1: Less than 2.0 N/cm (the antifreezing property is good)
2: 2.0 to less than 5.0 N/cm (freezing is slightly observed)
3: More than 5.0 N/cm (considerably freezed)

Water Resistance:

After immersing the coated sample in water at 40° C. for 240 hours, the surface state was observed and the water resistance was evaluated as follows.
1: The layer was not changed as compared with the layer before the immersion and had a good water resistance.
2: A bloom formed slightly.
3: A great bloom and falling of the layer were observed.

The material having the following composition was used as the EPDM rubber sponge which became the substrate of the weather strip.

| EPDM Rubber Sponge: | |
| --- | --- |
| EPDM | 120 parts |
| FEF Carbon | 30 parts |
| SRF Carbon | 50 parts |
| Paraffin Oil | 40 parts |
| Fatty Acid-Treated Light Calcium Carbonate | 35 parts |
| Zinc White | 5 parts |
| Stearic Acid | 1 part |
| Processing Aid | 2 parts |
| PEG 4000 | 1 part |

-continued

| Dehydrating Agent | 5 parts |
|---|---|
| Vulcanization Accelerator | |
| ZnMDC*[1] | 2.5 parts |
| ZnMBT*[2] | 0.5 part |
| MBTS*[3] | 0.7 part |
| TeEDC*[4] | 0.5 part |
| Sulfur | 1.8 parts |
| Foaming Agent OBSH*[5] | 2.5 parts |

*[1]Zinc dimethyldithiocarbamate
*[2]Zinc salt of 2-mercaptobenothiazole
*[3]Dibenzothiazyl disulfide
*[4]Tellurium diethyldithiocarbamate
*[5]4,4'-Oxybis(benzenesulfonylhydrazide)

EXAMPLE 1

To 230 parts of the dispersion D-1 as the component (D) was added 30 parts of γ-glycidoxypropyltrimethoxysilane as the component (C) followed by mixing with stirring, and 100 parts of the silicone emulsion A-1 as the component (A) and 50 parts of the silicone emulsion B-1 as the component (B) were then added to the mixture followed by mixing with stirring to obtain a silicone emulsion composition of the present invention.

The composition was dropped onto the EPDM rubber sponge using a dropping apparatus which uses a methanol pump, levelling coated with a felt, and cured by heating at 150° C. for 2 minutes to obtain a weather strip of the present invention. After allowing to stand the weather strip at room temperature for one day, the properties thereof were evaluated. The evaluation results of the silicone emulsion composition and the weather strip thus obtained are shown in Table 1 below.

EXAMPLES 2 TO 7

Using compositions shown in Table 1, the silicone emulsion compositions of the present invention were prepared, the weather strips were obtained in the same manner as in Example 1 using the silicone emulsion compositions, and they were evaluated. The results obtained are shown in Table 1 below.

COMPARATIVE EXAMPLE 1

By following the same procedure as in Example 1 except that the dispersion as the component (D) was not compounded, a weather strip was obtained and evaluated. The results obtained are shown in Table 2 below.

COMPARATIVE EXAMPLE 2

By following the same procedure as in Example 1 except that the silicone emulsion B'-1 was used in place of the silicone emulsion as the component (B), a weather strip was obtained and evaluated. The results obtained are shown in Table 2 below.

COMPARATIVE EXAMPLE 3

15 Parts of polymethylsilsesquioxane which was a component of the dispersion (D) was used in place of the dispersion as the component (D). After mixing with stirring the polymethylsilsesquioxane and the component (C), the mixture obtained was mixed with stirring with the component (A) and the component (B). 15 Parts of polyoxyethylene(15) phenyl ether and 200 parts of water, which were the remaining components of the dispersion, were further added thereto followed by mixing with stirring to obtain a silicone emulsion composition. A weather strip was obtained using the silicone emulsion composition by the same manner as in Example 1 and was evaluated. The results obtained are shown in Table 2 below.

COMPARATIVE EXAMPLE 4

By following the same procedure as in Example 1 except that 0.01 part of dibutyltin laurate was further compounded with the emulsion in Example 1 followed by mixing with stirring to obtain a silicone emulsion composition, and a weather strip was obtained using the silicone emulsion composition and evaluated. The results obtained are shown in Table 2 below.

COMPARATIVE EXAMPLE 5

By following the same procedure as in Example 1 except that 0.03 part of tetrabutyl titanate was further compounded with the emulsion in Example 1 followed by mixing with stirring to obtain a silicone emulsion composition, and a weather strip was obtained using the silicone emulsion composition and evaluated. The results obtained are shown in Table 2 below.

TABLE 1

| | Example | | | | | | |
|---|---|---|---|---|---|---|---|
| | 1 | 2 | 3 | 4 | 5 | 6 | 7 |
| Component (A): | | | | | | | |
| A-1 | 100 | | | 100 | 100 | 100 | 100 |
| A-2 | | 100 | | | | | |
| A-3 | | | 100 | | | | |
| Component (B): | | | | | | | |
| B-1 | 50 | 50 | 50 | | 50 | 20 | 200 |
| B-2 | | | | 50 | | | |
| Component (C): | | | | | | | |
| γ-Glycidoxypropyl-trimethoxysilane | 30 | 30 | 30 | 30 | 30 | 4 | 60 |
| Component (D): | | | | | | | |
| D-1 | 230 | 230 | 230 | 230 | | 77 | 460 |
| D-2 | | | | | 230 | | |
| Characteristics: | | | | | | | |
| Coating property | 1 | 1 | 1 | 1 | 1 | 1 | 2 |
| Pot life | 1 | 1 | 1 | 1 | 1 | 1 | 1 |
| Appearance | 1 | 1 | 1 | 1 | 1 | 1 | 1 |
| Adhesion | 1 | 1 | 1 | 1 | 1 | 1 | 2 |
| Friction coefficient | 1 | 1 | 1 | 1 | 1 | 1 | 1 |
| Abrasion resistance | 1 | 1 | 1 | 1 | 1 | 2 | 1 |
| Water resistance | 1 | 1 | 1 | 1 | 1 | 1 | 1 |
| Antifreezing property | 1 | 1 | 1 | 1 | 1 | 1 | 1 |

TABLE 2

| | Comparative Example | | | | |
|---|---|---|---|---|---|
| | 1 | 2 | 3 | 4 | 5 |
| Component (A): | | | | | |
| A-1 | 100 | 100 | 100 | 100 | 100 |
| Component (B): | | | | | |
| B-1 | 50 | | 50 | 50 | 50 |
| B'-1 | | 50 | | | |
| Component (C): | | | | | |

TABLE 2-continued

|  | Comparative Example | | | | |
| --- | --- | --- | --- | --- | --- |
|  | 1 | 2 | 3 | 4 | 5 |
| γ-Glycidoxypropyl-trimethoxysilane | 30 | 30 | 30 | 30 | 30 |
| Component (D): | | | | | |
| D-1 |  | 230 |  | 230 | 230 |
| Polymethylsilsesquioxane |  |  | 15 |  |  |
| Polyoxyethylene (15) phenyl ether |  |  | 15 |  |  |
| Water |  |  | 200 |  |  |
| Dibutyltin dilaurate |  |  |  | 0.01 |  |
| Tetrabutyl titanate |  |  |  |  | 0.03 |
| Characteristics: | | | | | |
| Coating property | 1 | 2 | 2 | 3*¹ | 2*¹ |
| Pot life | 1 | 1 | 1 | 3 | 2 |
| Appearance | 3 | 2 | 2 | 1 | 1 |
| Adhesion | 1 | 1 | 1 | 1 | 1 |
| Friction coefficient | 3 | 2 | 2 | 2 | 2 |
| Abrasion resistance | 3 | 1 | 3 | 1 | 1 |
| Water resistance | 1 | 1 | 1 | 1 | 2 |
| Antifreezing property | 1 | 2 | 1 | 2 | 2 |

*¹At coating, microgels were formed in the felt with the passage of time, whereby good coating became difficult.

While the invention has been described in detail and with reference to specific embodiments thereof, it will be apparent to one skilled in the art that various changes and modifications can be made therein without departing from the spirit and scope thereof.

What is claimed is:

1. A process of producing a weather strip for automobiles, which comprises coating a silicone emulsion composition formed by mixing and dispersing components (A) to (D) set forth below on the surface of a weather strip for automobiles comprising a foam or non-foam ethylene-propylene-diene copolymer rubber, and heat curing the coating at a temperature of from 50° to 250° C.;

(A) a silicone emulsion comprising
      (a) 100 parts by weight of a primary amino group-containing diorganopolysiloxane,
      (b) from 5 to 100 parts by weight of an emulsifier, and
      (c) from 50 to 500 parts by weight of water;
   (B) a silicone emulsion comprising
      (d) 100 parts by weight of a dimethylpolysiloxane having a viscosity of from 10,000 to 500,000 cP and having a silanol group at both the terminals thereof, said dimethylpolysiloxane being free of amino and epoxy groups,
      (e) from 5 to 100 parts by weight of an emulsifier, and
      (f) from 50 to 1,000 parts by weight of water; in an amount such that the amount of the component (d) is from 5 to 200 parts by weight per 100 parts by weight of the component (a),
   (C) γ-glycidoxypropyltrimethoxysilane in an amount of from 5 to 300 parts by weight of the component (a); and
   (D) a dispersion comprising
      (g) 100 parts by weight of a spherical polymethylsilsesquioxane fine powder having an average particle size of from 1.6 to 2.6 μm,
      (h) from 10 to 1,000 parts by weight of a surface active agent, and
      (i) from 10 to 500 parts by weight of water, in such an amount that the amount of the component (g) is from 5 to 200 parts by weight per 100 parts by weight of the component (a).

2. A process as claimed in claim 1, wherein the diorganopolysiloxane (a) further contains a methyl group and also contains one of a hydroxy group or a methoxy group.

3. A process as claimed in claim 1, wherein the emulsifier (b) is a nonionic surface active agent, an anionic surface active agent, or a cationic surface active agent.

4. A process as claimed in claim 1, wherein the amount of the emulsifier (b) is from 10 to 50 parts by weight per 100 parts by weight of the diorganopolysiloxane (a).

5. A process as claimed in claim 1, wherein the amount of water (c) is from 100 to 300 parts by weight per 100 parts by weight of the diorganopolysiloxane.

6. A process as claimed in claim 1, wherein the dimethylpolysiloxane (d) has a viscosity of from 50,000 to 200,000 cP.

7. A process as claimed in claim 1, wherein the emulsifier (e) is a nonionic surface active agent, an anionic surface active agent, or a cationic surface active agent.

8. A process as claimed in claim 1, wherein the amount of the emulsifier (e) is from 10 to 50 parts by weight per 100 parts by weight of the dimethylpolysiloxane (d).

9. A process as claimed in claim 1, wherein the amount of water (f) is from 100 to 300 parts by weight per 100 parts by weight of the dimethylpolysiloxane (d).

10. A process as claimed in claim 1, wherein the amount of component (B) is such that the amount of the dimethylpolysiloxane is from 20 to 100 parts by weight per 100 parts by weight of the organopolysiloxane (a).

11. A process as claimed in claim 1, the amount of component (C) is from 10 to 200 parts by weight per 100 parts by weight of the diorganopolysiloxane (a).

12. A process as claimed in claim 1, wherein the spherical polymethylsilsesquioxane fine powder (g) has an average particle size of from 1.8 to 2.2 μm.

13. A process as claimed in claim 1, wherein the spherical polymethylsilsesquioxane fine powder (g) has a particle size distribution of ±30% of the average particle size.

14. A process as claimed in claim 1, wherein the surface active agent (h) is a nonionic surface active agent, an anionic surface active agent, or a cationic surface active agent.

15. A process as claimed in claim 1, wherein the amount of the surface active agent (h) is from 50 to 200 parts by weight per 100 parts by weight of the spherical polymethylsilsesquioxane fine powder.

16. A process as claimed in claim 1, wherein the amount of water (i) is from 50 to 200 parts by weight per 100 parts by weight of component (h), the surface active agent.

17. A process as claimed in claim 1, wherein the amount of component (D) is such that the amount of the polymethylsilsesquioxane fine powder (g) is from 10 to 100 parts by weight per 100 parts by weight of the diorganopolysiloxane (a).

18. A process as claimed in claim 1, wherein the composition is coated in a coverage of from 5 to 25 cc/m².

19. A process as claimed in claim 1, wherein the composition is coated in a coverage of from 5 to 10 cc/m².

20. A process as claimed in claim 1, wherein the heat curing is conducted at a temperature of from 100° to 200° C.

21. A process as claimed in claimed 1, wherein the heat curing is conducted for from 1 to 10 minutes.

22. A process as claimed in claim 1, wherein the heat curing is conducted for from 2 to 5 minutes.

23. A process as claimed in claim 1, wherein silicone emulsion composition is coated using a spray coating method.

* * * * *